United States Patent [19]
Johnston et al.

[11] Patent Number: 5,134,280
[45] Date of Patent: Jul. 28, 1992

[54] OPTICAL FIBER TEST PROBE HAVING A SLEEVE-LIKE PLUNGER MOVABLE IN A BARREL

[75] Inventors: Charles J. Johnston, Walnut; Mark A. Swart, Upland, both of Calif.

[73] Assignee: Everett/Charles Contact Products, Inc., Pomona, Calif.

[21] Appl. No.: 715,025

[22] Filed: Jun. 13, 1991

Related U.S. Application Data

[63] Continuation of Ser. No. 526,199, May 21, 1990, abandoned.

[51] Int. Cl.$^5$ .............................................. H01J 5/16
[52] U.S. Cl. .................................. 250/227.11; 385/81
[58] Field of Search ...................... 250/227.11, 227.13; 350/96.2, 96.21; 385/138, 70, 81, 85

[56] References Cited

U.S. PATENT DOCUMENTS

| | | | |
|---|---|---|---|
| 3,498,692 | 3/1970 | Jewitt et al. | 250/227.13 |
| 4,705,942 | 11/1987 | Budrikis et al. | 250/227.13 |
| 4,808,815 | 2/1989 | Langley | 250/227 |
| 4,826,276 | 5/1989 | Abbott et al. | 350/96.21 |
| 4,846,544 | 7/1989 | Bortolin et al. | 350/96.21 |
| 4,900,125 | 2/1990 | Iyer | 350/96.2 |
| 4,941,727 | 7/1990 | Maranto et al. | 350/96.2 |

Primary Examiner—David C. Nelms
Assistant Examiner—Que T. Le
Attorney, Agent, or Firm—Christie, Parker & Hale

[57] ABSTRACT

Optical fiber test probes test the optical functions of light-emitting circuit elements or displays, or are used in optical test fixtures. In one embodiment, an optical fiber test probe comprises an optical fiber in two sections in which both are movable with a receptacle against the bias of a compression spring during testing. One fiber is contained within a removable barrel so it can be replaced by removing it from the receptacle independently of the compression spring. In their operative test position, the two optical fibers are mounted in the receptacle to maintain light-tight optical continuity during testing. In another embodiment, an optical fiber test probe comprises a barrel and an optical fiber contained within a plunger movable in the barrel, in which a free end portion of the optical fiber extends unsupported through a compression spring which applies a spring bias to an internal end of the plunger. The fiber optic probe is isolated from loads imposed on the plunger during repetitive testing with the probe. A further embodiment comprises a fiber optic test having a low compliance, one-piece, spring loaded, molded plastic optical fiber retainer.

14 Claims, 5 Drawing Sheets

OPTICAL FIBER TEST PROBE HAVING A SLEEVE-LIKE PLUNGER MOVABLE IN A BARREL

CROSS REFERENCE TO RELATED APPLICATIONS

This is a continuation-in-part of division of application Ser. No. 07/526,199, filed 05/21/90 abandoned.

FIELD OF THE INVENTION

This invention relates generally to the field of automatic test equipment, and more particularly, to the optical testing of electrical circuit components having a light-emitting function. More specifically, the invention relates to improved test probes that contain optical fibers for sensing optical signals produced by light-emitting circuit components and for producing corresponding electrical signals sent to a test unit programmed to perform electrical tests on a unit under test.

BACKGROUND OF THE INVENTION

In the automatic testing of electrical circuits, test probes of various configurations are used, depending upon such factors as the type of electrical device under test, the spacing between test points, and the like. The present invention is applicable, in part, to the testing of light-emitting circuit components that are present on printed circuit boards. These circuit components can include light-emitting diodes (LED's), optical displays, and opto-isolators, for example. These devices require optical testing of their light-emitting functions to determine whether light emission exceeds a minimum required intensity, whether light intensities produced by a number of components are uniform, and the like.

U.S. Pat. No. 4,808,815 to Langley discloses a test fixture used in conjunction with conventional automatic test equipment to perform optical testing of a wide variety of light-emitting devices. The fixture comprises a plurality of individual optical probes arranged in a preselected pattern. Each probe is disposed in close proximity to a light-emitting component. A fiber optic cable connects each probe to a detector. Each of the detectors produces an electrical output signal related to the intensity of the light conducted by its fiber optic cable. The output signals of the detectors are electrically connected to a conventional automatic test system for converting light intensity readings into electrical signals for testing the light-emitting functions of the circuit components of a unit under test.

In addition to directly testing the light-emitting functions of printed circuit board components, such as LED's, testing the electrical circuit continuity of electrical circuits or circuit components on a printed circuit board also can be performed optically. For instance, digital electrical signals can be converted at the board level to corresponding optical signals which can then be detected by optical fiber test probes for use in functional testing of the circuits or circuit components on the board. This avoids use of conventional electrical test probes. At very high digital signal pulse frequencies, electrical test probes can require shielding from surrounding electromagnetic fields, which adds to the expense of the test probes and increases the center-to-center mounting distance. This problem is avoided by using optic fiber test probes which produce a clean signal without being affected by surrounding electromagnetic fields. Optical fibers also have no line loss when compared with electrical signals which can degrade with noise.

There are variety of problems that must be addressed in developing an optical fiber test probe for use in automatic test equipment. The optical fiber probes must meet certain space requirements so they can easily match the close spacing pattern between LED's or other optical circuit elements that may be present on a circuit board.

Each fiber optic probe assembly contains a number of components, and the assembly should be arranged so that it requires relatively few components that can be quickly and easily assembled by mass production assembly techniques.

A fiber optic test probe commonly requires making direct contact with the light-emitting source during testing. This typically requires that the probe assembly include some sort of compression spring so that contact during test is spring-biased, and the spring then acts as a return spring when the test force is released. The fiber optic test probe assembly should be arranged so that spring forces applied during repetitive test sequences do not adversely affect reliable long-term operation of the fiber optic test probe. Moreover, the optical fibers used in these test probes can be of miniature size, say 0.005 inch in diameter, and the repetitive functioning of the probe during testing should not apply undue loading to the optical fiber.

The fiber optic probe assembly also should be designed so that, if replacement is necessary, the probe can be removed and replaced reliably, with minimal downtime and expense.

SUMMARY OF THE INVENTION

The present invention provides, in several embodiments, improved fiber optic test probes for use in automatic testing of electrical circuit components having a light-emitting function.

In one embodiment, the invention comprises an optical fiber test probe having an optical fiber in two sections, in which both are movable within a receptacle against the bias of a compression spring during testing. One optical fiber is contained within a removable barrel that can be replaced by removing it from the outer receptacle independently of the compression spring. In their operative test positions, the two optical fibers are mounted in the receptacle to maintain light-tight optical continuity during testing. The removable barrel makes it possible to replace the end portion of the probe, which receives the most wear during use, without requiring substantial disassembly of the probe, or disconnection of the probe from its detector unit.

Another form of the invention comprises an optical fiber probe having a barrel and an optical fiber contained within a plunger which is movable in the barrel. A free end of the optical fiber extends unsupported through a compression spring which applies a spring bias to an internal end of the plunger. The optical fiber is isolated from loads imposed during repetitive testing with the probe. The probe assembly can be made in miniature sizes for probing closely spaced apart optical test points.

A further embodiment of the invention comprises a low compliance, one-piece, spring loaded, molded plastic fiber optic retainer for an optical fiber probe. This fiber optic test probe can provide reliable spring-biased testing with minimal assembly and manufacturing costs.

These and other aspects of the invention will be more fully understood by referring to the following detailed description and the accompanying drawings.

DETAILED DESCRIPTION

Figure 1:
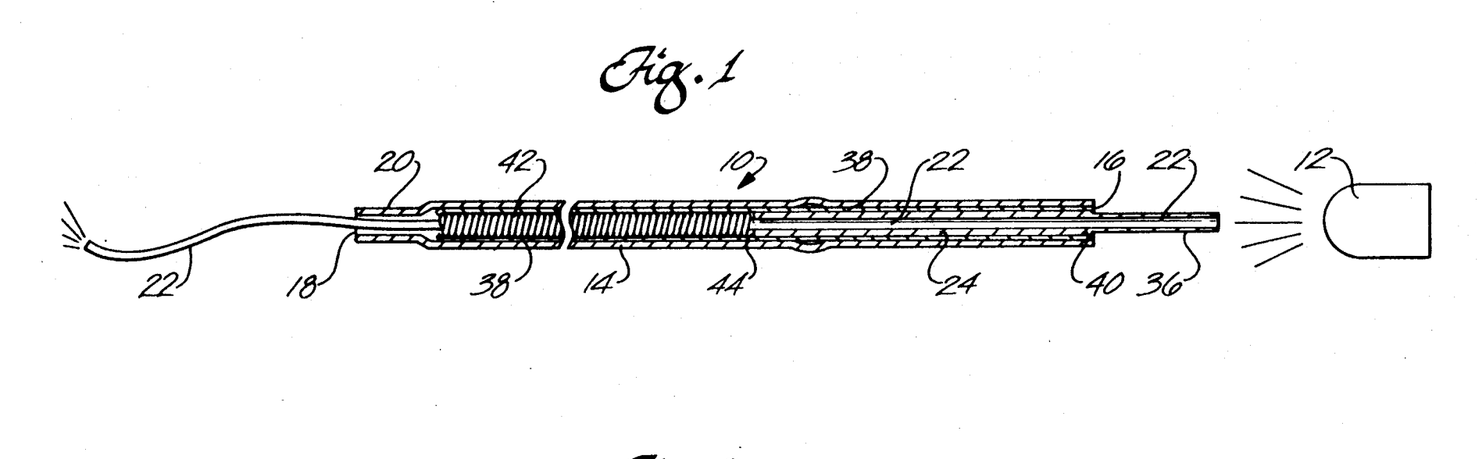
FIG. 1 is a fragmentary cross-sectional view illustrating an assembled fiber optic probe according to principles of this invention.
Figure 2:
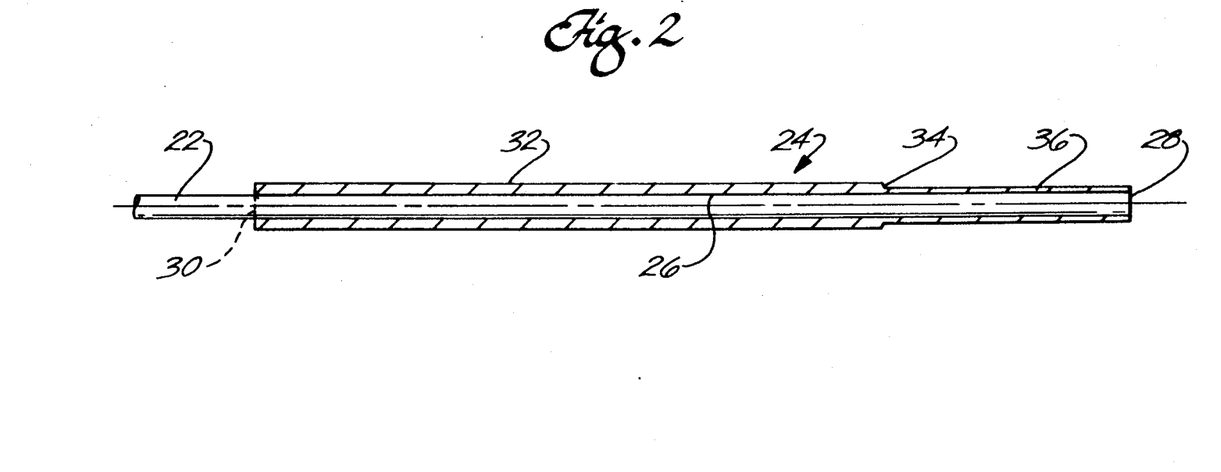
FIG. 2 is an enlarged cross-sectional view illustrating a plunger and fiber optic filament contained within the probe of FIG. 1.

FIGS. 1 and 2 are cross-sectional views illustrating one embodiment of an optical fiber test probe 10 according to principles of this invention. The test probe, and others described herein, can be used in an optical test fixture for the automatic testing of circuit components having a light-emitting function, such as LED's or displays, or for the optical testing of electrical circuits and circuit components on a printed circuit board. In a typical use of the optical fiber test probe, an optical fixture (not shown) comprises a plurality of the optical fiber test probes, each of which is connected to an optical detector (not shown) by a corresponding fiber optic cable (not shown). The probes are positioned close to a unit under test on which light-emitting circuit components are sensed optically by corresponding fiber optic test probes. FIG. 1 illustrates a light-emitting circuit component 12 probed by the test probe 10. The sensed light is conducted from the optical test probes along the fiber optic cables to corresponding optical detectors. Output lines (not shown) from the detectors are coupled to electrical sensors (not shown) for converting the optical signals to corresponding electrical signals having an output proportional to the intensity of the light sensed by the fiber optic test probe. The sensors are electrically coupled to an automatic test unit programmed to perform a series of electrical tests on the unit under test and to provide output signals of corresponding test data.

The fiber optic test probe 10 includes an elongated cylindrical outer receptacle 14 having a hollow interior extending from a first open end 16 to an opposite second open end 18 of the receptacle. The second open end 18 is at a reduced diameter terminal end portion 20 of the receptacle. The first and second open ends of the receptacle are centered on a major longitudinal axis of the receptacle.

An optical fiber 22 carried in a tubular plunger 24 is contained within the hollow interior of the receptacle. FIG. 2 is an enlarged view of the tubular plunger 24. The optical fiber 22 has a monofilament light-conducting inner core surrounded by an outer cladding. A relatively short end section of the optical fiber is inserted in the plunger 24 which surrounds and is affixed to the optical fiber. A relatively long remaining portion of the optical fiber extends freely and unsupported from the end of the plunger. The plunger has a uniform diameter bore 26 which matches the outside diameter of the optical fiber. The plunger is secured to the outer surface of the optical fiber by an adhesive boning material or by a crimp in the wall of the plunger. This rigidly secures the plunger to the optical fiber so as to provide rigid reinforcement along the probing end of the optical fiber. In the embodiment shown in FIGS. 1 and 2, the plunger has a first open end 28 and a second open end 30 at opposite ends of the bore through the plunger. A long, wide O.D. (outside diameter) section 32 of the plunger extends from the second open end along a majority of the length of the plunger and is stepped down to form an annular shoulder 34 inboard from a elongated narrow O.D. section 36 adjacent the first end 28 of the plunger. The optical fiber extends through the entire inside diameter of the plunger to provide the reinforced probing end portion of the optical fiber.

The plunger and the optical fiber are contained in an elongated tubular barrel 38 that makes a close fit in the interior of the receptacle. The barrel is held in a fixed position inside the receptacle. The plunger 24 and the length of the optical fiber 22 within it are contained within one end portion of the barrel. The main outside diameter section 32 of the plunger extends through a narrow opening 40 at one end of the barrel. An elongated compression spring 42 extends through a first end portion of the barrel interior and is biased against an annular end 44 of the plunger inside the barrel. The plunger and optical fiber are movable axially within the barrel. The opening 40 of the barrel is flanged to confront the annular shoulder 34 on the plunger to act as a stop against outward travel of the barrel under the bias of the compression spring. Therefore, under the normal bias of the compression spring, the barrel is forced toward the end 16 of the receptacle against the stop, and the narrow-diameter portion 36 of the plunger protrudes out from the end of the probe, along with the optical fiber inside it, for use in probing the light-emitting device 12. The unsupported free end of the optical fiber extends internally within the barrel through the center of the compression spring and exits the narrow terminal end portion 20 of the receptacle.

During probing of the light-emitting device 12, any contact under force between the probe and the light-emitting device. 12 causes the plunger 24 to move into the barrel 38 and receptacle 14 against the bias of the compression spring 42. When the test force is released, the compression spring acts as a return spring to move the probe back to its normal position shown in FIG. 1.

The fiber optic probe shown in FIG. 1 can be of miniature size. The optical fiber 22 can have an O.D. of 0.005 inch, for example. The assembly shown in FIG. 1 avoids the optical fiber 22 pre-loading the spring force, and avoids any undue stress imposed on the optical fiber from repetitive probing operations.

Figure 3:
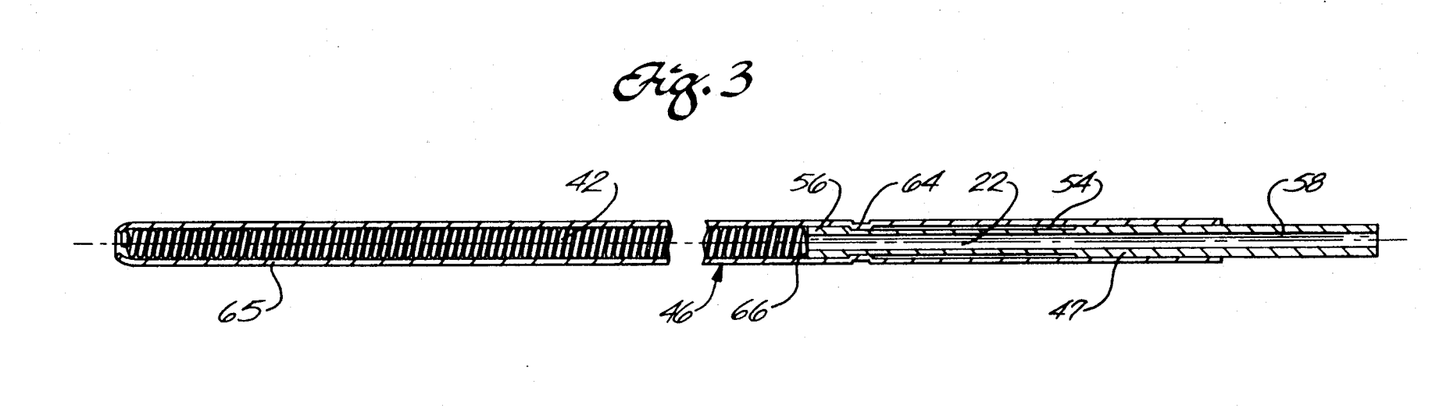
FIG. 3 is a cross-sectional view illustrating an alternative embodiment of the fiber optic probe of FIG. 1.
Figure 4:
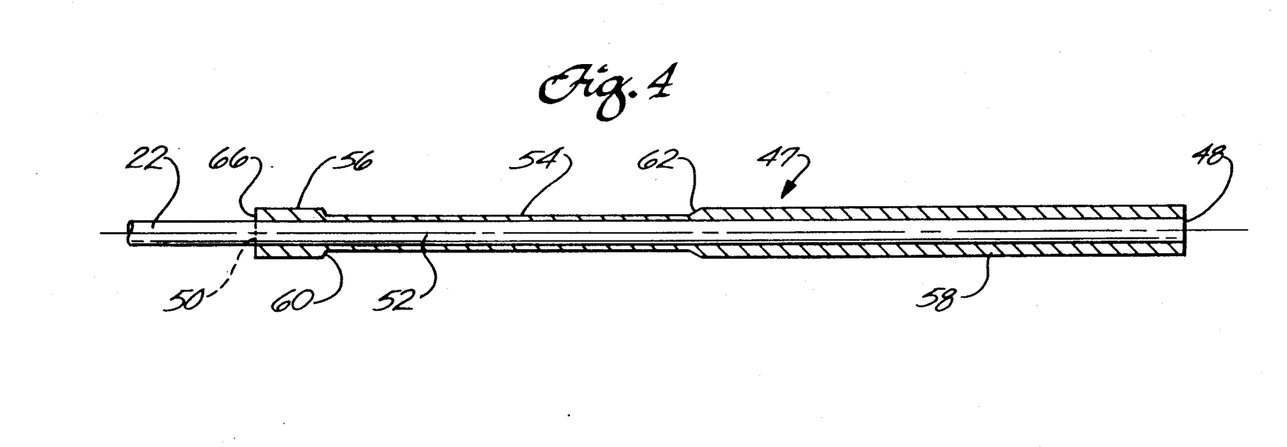
FIG. 4 is an enlarged cross-sectional view illustrating a plunger and optical fiber component of the assembly shown in FIG. 3.

FIGS. 3 and 4 illustrate an alternative form of the test probe shown in FIGS. 1 and 2 in which all components are the same, except that the barrel 38 shown in FIGS. 1 and 2 is replaced by an alternative tubular barrel 46 shown in FIG. 3, and the plunger 24 shown in FIGS. 1 and 2 is replaced with the plunger 47 best shown in FIG. 4. The receptacle of the probe is not shown in FIGS. 3 or 4 for simplicity.

Referring to FIGS. 3 and 4, the plunger 47 has a uniform inside diameter with first and second open ends 48 and 50 aligned on an axis 52 through the tubular plunger. An elongated uniform diameter undercut 54 extends along the outside diameter of the plunger inboard from the first and second ends of the plunger. The undercut is spaced inwardly from a short, wide diameter section 56 of the plunger adjacent the second open end of the plunger and from a long, wide diameter section 58 at the opposite, probing end of the plunger.

As shown best in FIG. 3, the short end section 56 and long end section 58 of the plunger make a close sliding fit inside the outer barrel. The undercut forms annular shoulders 60 and 62 adjacent the short and long wide-diameter sections 56 and 58 of the plunger. The plunger is retained in the barrel by a stop formed by an annular indentation or "roll close" 64 formed on the barrel inboard from the probing end of the barrel. The compression spring 42 is disposed within a long spring retaining portion 65 of the barrel. The spring engages an annular shoulder 66 at the inside end of the plunger so that, under the normal bias of the compression spring, the shoulder 60 of the undercut is in spring-biased pressure against the stop formed by the indentation 64. This retains the probing end 58 of the plunger outside the barrel, as shown in FIG. 3.

The probe shown in FIG. 3 functions in a manner similar to that described in FIGS. 1 and 2, in that the optical fiber 22 is rigidly affixed inside the plunger 47, and then extends freely and unsupported through the center of the compression spring 42 to the exterior of the probe. The normal bias of the compression spring holds the probing end of the optical fiber in its external position shown in FIG. 3, and during spring-pressure contact with a light-emitting device, the plunger 47 and the optical fiber within it can be retracted into the interior of the barrel 46 against the bias of the spring. The full length of travel of the plunger into the spring can be restrained by the shoulder 62 of the undercut engaging the indentation 64. The compression spring acts as a return spring to return the plunger to the position shown in FIG. 3 when the probing force is released.

Figure 5:
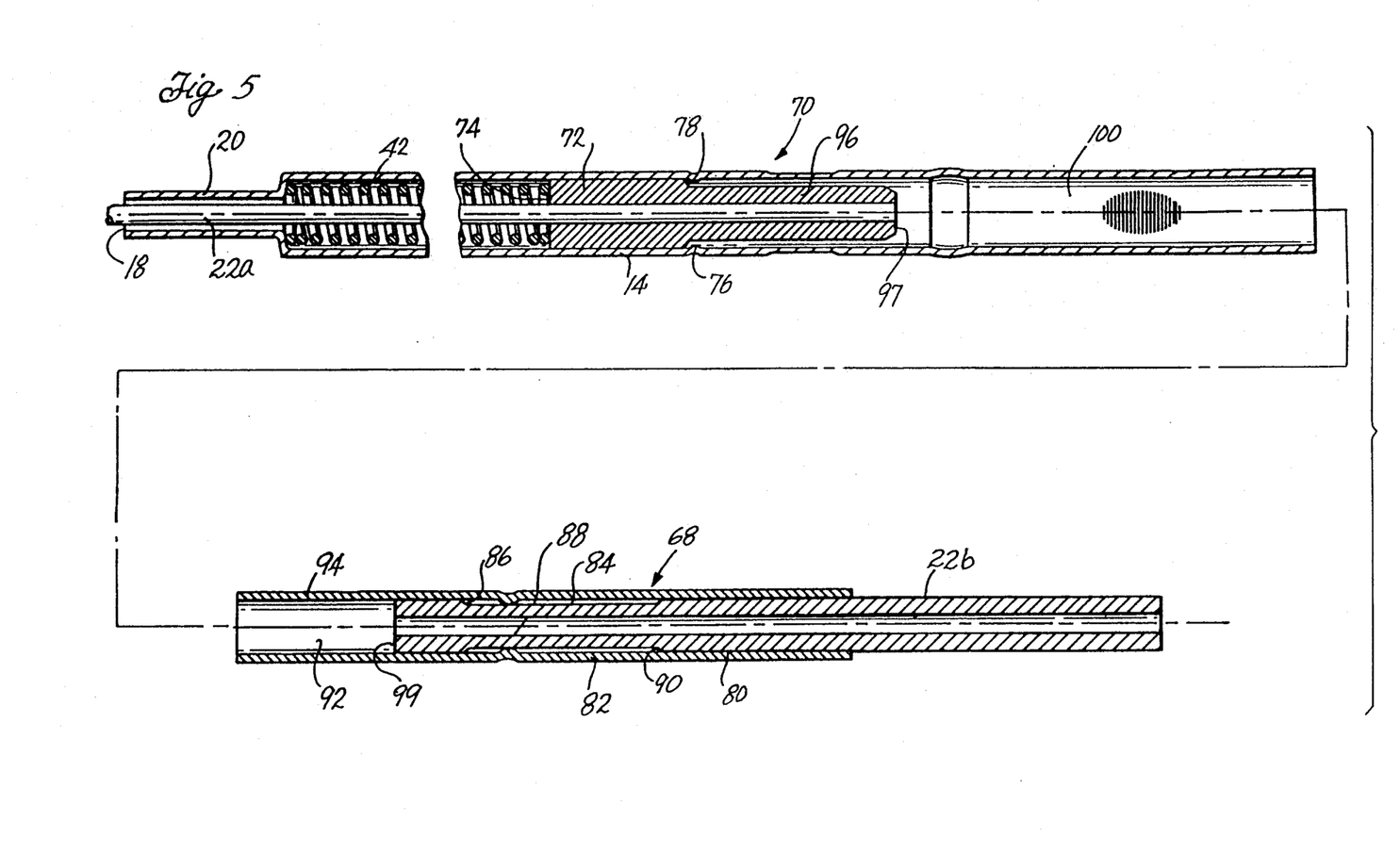
FIG. 5 is an exploded cross-sectional view illustrating components of a fiber optic probe having a replaceable section.
Figure 6:
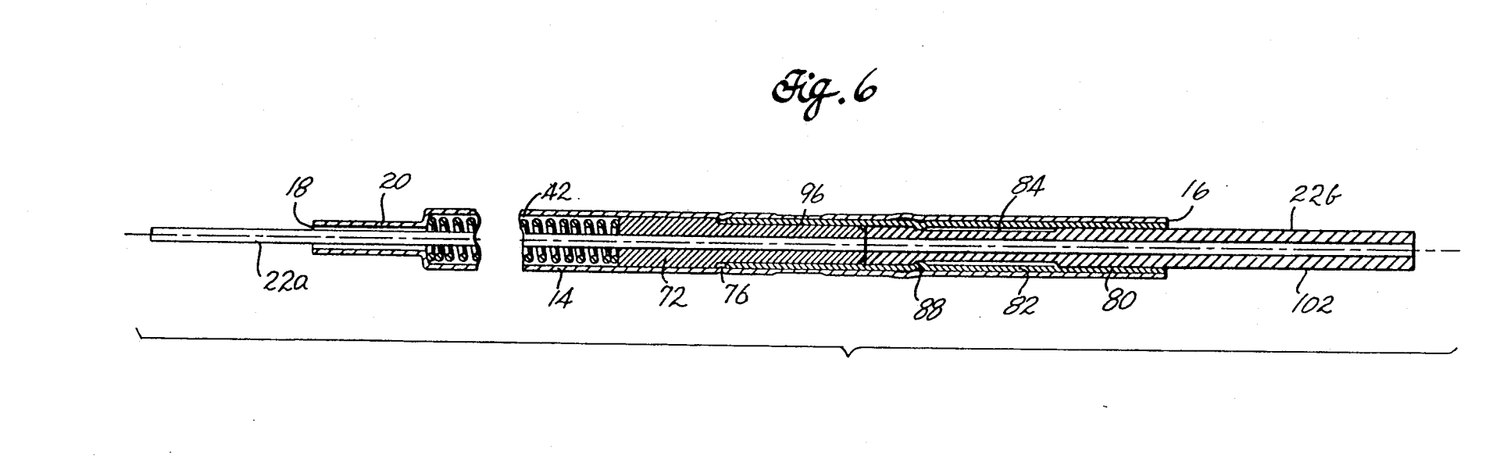
FIG. 6 is a cross-sectional view illustrating the assembled probe illustrated in FIG. 5.

FIGS. 5 and 6 illustrate a fiber optic probe assembly having a replaceable probing end section 68 which is removable from a fixed portion 70 of the probe. As shown best in the exploded view of FIG. 5, the monofilament optical fiber is in two sections comprising a first optical filament 22a and a separate second optical filament 22b. The first optical filament 22a is retained inside the receptacle by a first plunger 72 which is slidable in the receptacle. The first plunger 72 surrounds and is rigidly affixed to the optical filament 22a. The compression spring 42 contained within a spring housing in the receptacle applies a spring force to an annular end 74 of the first plunger. The remaining end portion of the first optical filament 22a extends freely away from and is unsupported and extends through the compression spring to the outside of the probe. An annular indentation 76 in a wall of the receptacle 14 engages an annular shoulder 78 on the outside diameter of the first plunger to form an internal stop in the receptacle. The normal bias of the compression spring holds the first plunger against the stop.

The second optical filament 22b is retained in a second tubular plunger 80 which surrounds and is rigidly affixed to the filament. The entire length of the second filament is coextensive with the length of the reinforcing outer second plunger 80. The second optical filament and its plunger are slidably disposed within a replaceable tubular barrel 82. The outer surface of the second plunger has an elongated undercut 84 which forms an annular shoulder 86 adapted to engage an annular indentation 88 projecting into the passage way through the barrel 82. This provides a stop against outward travel of the second plunger and the probing end of the second optical filament 22 from the removable barrel 82. An annular shoulder 90 at the opposite end of the undercut retains the second plunger inside the barrel, limiting travel in the opposite direction.

The second plunger 80 is movable in the barrel 82 so as to leave a void 92 inside an elongated sleeve-like open-end section 94 of the barrel. The inside diameter of the sleeve-like section 94 is slightly greater than the outside diameter of a narrow, reduced-diameter end section 96 of the first plunger 72 which extends toward the probing end of the probe, away from the compression spring. The sleeve section 94 of the second plunger can be inserted into an open end 100 of the receptacle and frictionally engaged with the inside of the receptacle so as to surround the narrow end section 96 of the first plunger 72. During assembly, the sleeve-like section 94 surrounds the narrow end section 96 of the first plunger to form a light-tight housing around the ends of the optical fiber filaments 22a and 22b. An annular end 97 of the first plunger 72 abuts against an annular end 99 of the second plunger 80 inside the light-tight housing, so that the ends of the optical filaments 22a and 22b are joined together co-axially inside the housing to thereby form optical continuity between the first and second sections of the optical fiber.

FIG. 6 shows the assembled replaceable test probe in which the compression spring 42 applies an axial spring bias to the first and the second plungers, which holds the two plungers together as a unit against the stop 76. In this normal position of the probe, the light-tight housing provides optical continuity between the two optical filaments, and a probing end portion 102 of the removable probe projects outwardly for contact with a light emitting device under test. During such contact under spring pressure, the first and second plungers move as a unit within the receptacle against the bias of the compression spring. During such travel the barrel 68 is frictionally held in engagement with the receptacle so that travel of the first and second plungers and their corresponding optical fiber filaments is relative to the fixed barrel.

If during use it is necessary to replace the probing end of the probe, the sleeve-like section 94 of the barrel can be manually pulled out of engagement with the inside of the receptacle so that the probing end 68 of the probe can be removed from the receptacle independently of the compression spring 42. An identical probing unit 68 then can be inserted into the open end 100 of the probe for quick replacement and continued operation. Replacement is performed without requiring disconnection of the probe assembly from its detector unit.

Figure 7:
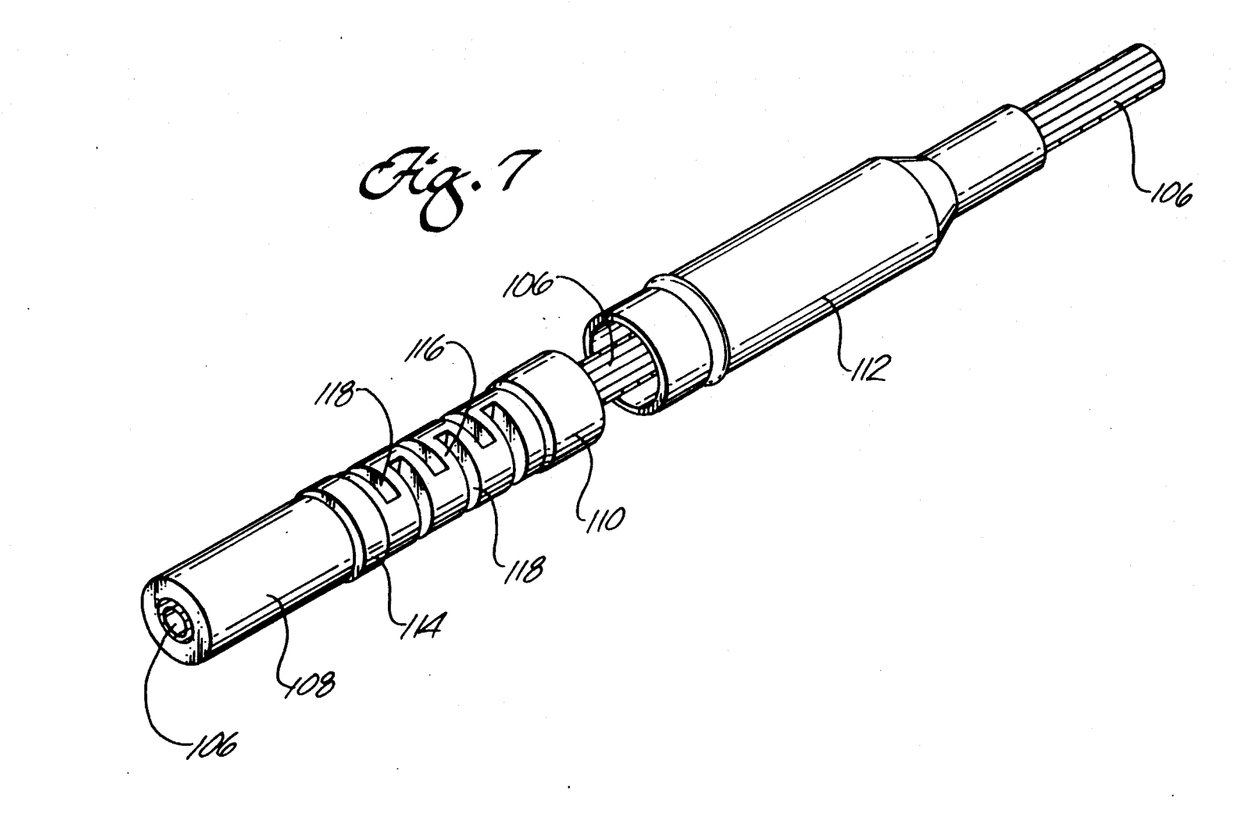
FIG. 7 is a perspective view illustrating a one-piece, low compliance, molded plastic optical fiber retainer for a optical fiber test probe.

FIG. 7 is an exploded view illustrating a further alternative embodiment of the invention comprising a one-piece, low compliance, molded plastic optical fiber retainer for an optical fiber test probe. In this embodiment of the invention, a monofilament optical fiber 106 extends through the probe assembly and is rigidly affixed inside a low-compliance, molded plastic optical fiber retainer 108. An enlarged press fit area 110 on the retainer 108 is frictionally engaged inside a tubular barrel 112 for rigidly holding the retainer in a fixed position inside the barrel. A pilot bearing 114 on the outside of the retainer 108 engages an inside wall of the barrel 112 to control sliding travel of the retainer in the barrel. A molded plastic compliant area 116 of the retainer surrounds the optical fiber 106 and is compressible under a probing force at the probing end of the barrel. In the illustrated embodiment, the compliant area is formed by a series of grooves 118 which are spaced apart axially and are interleaved along the annular wall section of the retainer. The optical fiber is rigidly secured to the retainer only in the front, probing end portion of the retainer, in front of the compliant area 116. Other embodiments of the compliant area also are possible, including a helically grooved compliant areas of the retainer. The retainer thus compresses volumetrically into the barrel under a probing force and is extendable to return the probing end of the barrel t its normal position when the probing force is released.

What is claimed is:

1. An optical fiber test probe assembly for optically testing electrical circuit components having a light-emitting function, comprising:
   an optical fiber;
   a sleeve-like plunger affixed to and surrounding an elongated first portion of the optical fiber to reinforce the first portion of the optical fiber;
   the plunger being disposed within the interior of the barrel so the plunger is movable axially in a first portion of the barrel interior, with an external probe end portion of the optical fiber and the surrounding plunger projecting outwardly from the probe end of the barrel;
   an elongated compression spring disposed within a second portion of the barrel interior to apply spring pressure to an end of the plunger within the barrel spaced from the probe end of the barrel, in which a terminal portion of the optical fiber extends freely through the compression spring and projects freely outwardly from the terminal end of the barrel; and
   retaining means on the barrel for engaging stop means on the plunger to retain the plunger and the optical fiber within the barrel under the normal bias of the compression spring, the plunger and optical fiber being movable axially into the barrel against the normal bias of the compression spring upon pressure contact between the probe end portion of the optical fiber and a light-emitting device on a unit under test, the probe end portion of the optical fiber receiving light emitted from said device so that a detector coupled to the terminal end of the optical fiber outside the barrel can produce an output signal in response to the light conducted from the optical fiber to provide a test measurement of the intensity of the light.

2. Apparatus according to claim 1 including a receptacle having a hollow interior, and in which the optical fiber is disposed within the receptacle in a close fit, with the terminal end of the optical fiber projecting freely from the end of the receptacle for connection to the detector.

3. Apparatus according to claim 1 in which the plunger makes a close, sliding fit within the first portion of the barrel, and the compression spring applies spring pressure to an annular end of the plunger inside the barrel.

4. Apparatus according to claim 1 in which the plunger has a narrow outer end portion that projects from the barrel, and a wider internal portion that provides the stop means for engaging the retaining means on the barrel which extend around the narrow outer end portion of the plunger to engage the stop means.

5. Apparatus according to claim 1 in which the plunger has an undercut disposed within the first portion of the barrel to provide the stop means for engaging a detente formed on a wall of the barrel that provides the retaining means.

6. An optical fiber test probe assembly for optically testing electrical circuit components having a light-emitting function, comprising:
   a receptacle having a hollow interior;
   a first optical fiber;
   a first plunger affixed to and surrounding the first optical fiber, the first plunger being movably disposed within the receptacle to move the first optical fiber axially within the receptacle;
   a compression spring within the receptacle applying pressure to the first plunger;
   stop means within the receptacle interior to resist movement of the first plunger and the first optical fiber under the normal bias of the compression spring, the first plunger and first optical fiber being movable axially within the barrel away from the stop means and against the bias of the spring;
   a second optical fiber;
   a second plunger affixed to and surrounding the second optical fiber to reinforce the second optical fiber;
   a barrel containing the second plunger and the second optical fiber, the barrel being removably disposed within the interior of the receptacle by sliding it to a fixed, operative position within the receptacle in which the second optical fiber engages the first optical fiber to provide light-tight optical continuity between the first and second optical fibers, the opposite end of the second optical fiber and second plunger having a probe end portion projecting outwardly to the exterior of the receptacle;
   the barrel having a tight friction fit within the receptacle in said operative position, but being removable under manual pressure from the receptacle to also remove the second optical fiber and its plunger from the receptacle;
   the first and second optical fibers and their respective plungers being movable axially into the receptacle against the basis of the compression spring upon contact between the probe end portion of the second optical fiber and a light-emitting device on a unit under test; and
   means for retaining the second plunger and the second optical fiber within the barrel so the second optical fiber and its plunger are movable axially relative to the barrel which remains fixed during axial travel of the second optical fiber and its plunger, the probe end portion of the second optical fiber receiving light emitted from said light-emitting device so that a detector coupled to an external terminal end of the first optical fiber can produce an output signal in response to light conducted by the first and second fibers to provide a test measurement of the intensity of the light.

7. Apparatus according to claim 6 in which the first plunger makes a close, sliding fit within the receptacle, and the compression spring applies spring pressure to an annular end of the first plunger inside the barrel.

8. Apparatus according to claim 7 in which a portion of the first optical fiber extends away from the first plunger and through the compression spring to the exterior of the receptacle for contact with a detector.

9. Apparatus according to claim 8 in which the portion of the optical fiber extending through the compression spring is unsupported.

10. Apparatus according to claim 6 in which the retaining means comprise an undercut on the second plunger for engaging a detente formed in a wall of the barrel.

11. Apparatus according to claim 6 in which the receptacle has an open, sleeve-like internal end portion which extends around a reduced diameter end portion of the first plunger.

12. Apparatus according to claim 6 in which the stop means comprises a detente formed in the receptacle and projecting into the interior of the receptacle for engagement with a shoulder formed adjacent a reduced diameter section of the first plunger.

13. Apparatus according to claim 6 in which the barrel and the first plunger are releasably engaged in a light-tight, frictional fit surrounding the first and second optical fibers.

14. An optical fiber test probe assembly for optically testing electrical circuit components having a light-emitting function, comprising:
 a receptacle having a hollow interior;
 an optical fiber in two sections forming first and second collinear filaments;
 a first plunger contained within the receptacle for retaining the first filament;
 a compression spring in the receptacle biasing the first plunger and the first filament;
 a second plunger retaining the second filament, the second plunger being a sleeve-like device affixed to and mechanically reinforcing the second filament; and
 a removable barrel disposed within the receptacle and retaining the second plunger and the second filament, the barrel and the first plunger being engaged internally within the receptacle in an operative position forming a light-tight housing surrounding adjacent ends of the first and second filaments to provide optical continuity between the two filaments, and in which a probe end portion of the second filament and the second plunger projects from the receptacle for contact with a light-emitting device;
 the first and second filaments being movable within the receptacle against the bias of the compression spring during contact between the probe end portion of the second filament and the light-emitting device, the first filament projecting from a terminal end of the receptacle for conducting light to a detector external to the receptacle to provide a test measurement of the intensity of the transmitted light;
 the barrel and its retained second plunger and second filament being removable as a unit from the receptacle independently of the compression spring.

* * * * *

UNITED STATES PATENT AND TRADEMARK OFFICE
CERTIFICATE OF CORRECTION

PATENT NO. : 5,134,280
DATED : July 28, 1992
INVENTOR(S) : Charles J. Johnston; Mark A. Swart It is certified that error appears in the above-indentified patent and that said Letters Patent is hereby corrected as shown below:

On the Title Page:

Abstract, line 20, after "test" insert -- probe --.

Column 1, line 9, change "continuation-in-part of division" to -- continuation --.

Column 2, line 3, before "variety" insert -- a --.
Column 2, line 19, after "during" change "test" to -- testing --.

Column 4, line 7, change "boning" to -- bonding --.
Column 4, line 17, before "elongated" change "a" to -- an --.
Column 4, line 48, after "device" chnage "!2" to -- 12 --.
Column 4, line 50, after "emitting device" delete the period.

Column 6, line 68, change "!12" to -- 112 --.

Column 7, line 14, change "areas" to -- area --.
Column 7, line 17, after "barrel" change "t" to -- to --.

In the Claims

Column 7, lines 26,27, between lines 26,27, insert the following: -- a barrel having a hollow interior and a probe end and an opposite terminal end; --.

UNITED STATES PATENT AND TRADEMARK OFFICE
CERTIFICATE OF CORRECTION

PATENT NO. : 5,134,280
DATED : July 28, 1992
INVENTOR(S) : Charles J. Johnston; Mark A. Swart It is certified that error appears in the above-indentified patent and that said Letters Patent is hereby corrected as shown below:

Column 8, line 7, change "detente" to -- detent --.
Column 8, line 47, change "basis" to -- bias --.

Column 9, lines 8,15, change "detente" to -- detent -- (both occurrences).

Signed and Sealed this

Twelfth Day of April, 1994

Attest:

BRUCE LEHMAN

Attesting Officer

Commissioner of Patents and Trademarks